United States Patent
Coile et al.

[11] Patent Number: 6,104,717
[45] Date of Patent: Aug. 15, 2000

[54] SYSTEM AND METHOD FOR PROVIDING BACKUP MACHINES FOR IMPLEMENTING MULTIPLE IP ADDRESSES ON MULTIPLE PORTS

[75] Inventors: Brantley W. Coile, Athens; Richard A. Howes, Roswell; Edward C. Kersey, Athens, all of Ga.

[73] Assignee: Cisco Technology, Inc., San Jose, Calif.

[21] Appl. No.: 08/850,836

[22] Filed: May 2, 1997

Related U.S. Application Data

[63] Continuation-in-part of application No. 08/552,807, Nov. 3, 1995, Pat. No. 5,793,763.

[51] Int. Cl.$^7$ ........................................... H04J 3/02
[52] U.S. Cl. ..................... 370/401; 370/352; 370/356; 370/392; 395/200.8
[58] Field of Search ......................... 370/352, 356, 370/401, 402, 389, 392; 379/93.35, 211, 215, 93.01; 395/200.75, 200.8, 917; 455/12.1, 427, 428

[56] References Cited

U.S. PATENT DOCUMENTS

| | | | |
|---|---|---|---|
| 5,317,562 | 5/1994 | Nardin et al. | 370/16 |
| 5,317,725 | 5/1994 | Smith et al. | 395/575 |
| 5,371,852 | 12/1994 | Attanasio et al. | 395/200 |
| 5,473,599 | 12/1995 | Li et al. | 370/16 |
| 5,617,417 | 4/1997 | Sathe et al | 370/394 |
| 5,805,587 | 9/1998 | Norris et al. | 370/352 |
| 5,809,128 | 9/1998 | McMullin | 379/215 |
| 5,854,901 | 12/1998 | Cole et al. | 395/200.75 |
| 5,894,554 | 4/1999 | Lowery et al. | 395/200.33 |

FOREIGN PATENT DOCUMENTS

| | | | |
|---|---|---|---|
| PCT/FR96/ 01179 | 2/1997 | WIPO | H04L 29/06 |

*Primary Examiner*—Douglas W. Olms
*Assistant Examiner*—Shick Hom
*Attorney, Agent, or Firm*—Ritter, VanPelt & Yi

[57] ABSTRACT

A system and method are disclosed for redirecting a connection from a first server having a first server IP address. Incoming SYN packets sent from a client are intercepted. The SYN packets have a destination IP address corresponding to the connection and the SYN packets are sent from the client for the purpose of establishing the connection, which is supported by the first server. The number of incoming SYN packets sent from the client to the first server is monitored and it is determined whether the number of unanswered SYN packets sent by the client to the first server exceeds a ditched connection threshold number of unanswered SYN packets. The destination IP address of intercepted incoming SYN packets is changed for the connection received after determining that the number of unanswered SYN requests sent by the client to the first server exceeds a ditched connection threshold number of unanswered SYN requests to the destination IP address of a second server. In this manner, the SYN packets sent from the client for the purpose of establishing the connection are sent to the second server so that the connection is established with the second server.

35 Claims, 11 Drawing Sheets

FIG. 2C

VIRTUAL MACHINE OBJECT 201

| | |
|---|---|
| 202 | POINTER TO NEXT VIRTUAL MACHINE OBJECT |
| 204 | VIRTUAL IP ADDRESS |
| 206 | POINTER TO A PORT OBJECT |
| 208 | POINTER TO LINK OBJECT |
| 210 | STATE |
| 212 | BACKUP |

FIG. 2D

PHYSICAL MACHINE OBJECT 278

| | |
|---|---|
| 220 | POINTER TO NEXT PHYSICAL MACHINE OBJECT |
| 221 | PHYSICAL IP ADDRESS |
| 222 | STATE |
| 224 | NUMBER OF DITCHED CONNECTIONS |
| 226 | CONNECTION FAILURE THRESHOLD |
| 228 | POINTER TO BACKUP |
| 230 | PORT VARIABLE |

FIG. 2E

CONNECTION OBJECT 240

| | |
|---|---|
| 241 | POINTER TO NEXT CONNECTION OBJECT |
| 242 | FOREIGN IP ADDRESS |
| 244 | FOREIGN PORT NUMBER |
| 246 | VIRTUAL IP ADDRESS |
| 248 | VIRTUAL PORT NUMBER |
| 250 | PHYSICAL IP ADDRESS |
| 252 | PHYSICAL PORT NUMBER |
| 253 | NUMBER OF RESENDS |

FIG. 2F

PORT OBJECT 280

| | |
|---|---|
| 262 | POINTER TO NEXT PORT OBJECT |
| 264 | VIRTUAL PORT NUMBER |
| 266 | PHYSICAL PORT NUMBER |

SYSTEM AND METHOD FOR PROVIDING BACKUP MACHINES FOR IMPLEMENTING MULTIPLE IP ADDRESSES ON MULTIPLE PORTS

CROSS REFERENCE TO RELATED APPLICATIONS

This application is a continuation in part of application Ser. No. 08/552,807 Nov. 3, 1995 issued U.S. Pat. No. 5,793,763, which is herein incorporated herein by reference for all purposes.

This application is related to co-pending application Ser. Nos. 08/850,248 and 08/850,730 filed concurrently herewith, which are incorporated herein by reference for all purposes.

BACKGROUND OF THE INVENTION

The present invention relates to a system and method for implementing multiple virtual IP addresses and virtual ports on multiple ports of a physical machine and for providing backup virtual and physical machines. More specifically, the invention relates to methods and apparatus for intercepting packets which are addressed to a virtual port on a virtual machine and translating the destination IP address and the destination port number to a destination IP address and destination port number of a physical machine which acts as a host or server and is selected to handle connections. The status of each physical and virtual machine is tracked, and when a new connection is established, the status of the physical and virtual machines is checked and a backup machine is used, if necessary.

With the recent explosive growth of the Internet, a very large percentage of businesses, including many small businesses, desire to have an internet site which is dedicated to them. An internet site is generally implemented on an internet server which is connected to the internet via an internet service provider (ISP). Some internet sites are busy enough to require a plurality of servers in order to handle all of the connections which are made to those sites. Accordingly, co-pending application Ser. No. 08/850,248 hereinafter referred to as Reference 1, describes a system and method for monitoring the a availability of servers at an Internet site which simulate a virtual server and preferentially sending new connection requests to servers which are available for connections and which are likely to have faster response times.

For less visited sites, the opposite situation is presented. Instead of one site requiring a plurality of servers, it would be desirable to combine a plurality of sites on a single server, since each one of the individual sites would not require all of the capacity of the server in order to service its connection traffic. It is also true that Internet traffic tends to be distributed among sites in a manner which is nonhomogenous. That is, certain sites receive a very large quantity of traffic while others receive little or no traffic. Furthermore, traffic on certain cites may increase or decrease unpredictably. Accordingly, co-pending application Ser. No. 08/850,730, hereinafter referred to as Reference 2, describes a system and method for sharing connection load among a group of servers in a manner that allows each server to service more than one site and multiple servers to share the load for individual sites.

Round robin DNS is a method that is used to distribute connections among servers. The DNS server returns a different IP address in response to the same domain name in a round robin fashion. Currently, when round robin DNS is used and a machine in the round robin rotation fails, the round robin DNS will still attempt to route connections to that machine when that machine's turn comes up. There is no mechanism for determining which machines have failed and avoiding sending connections to those machines. This is a consequence of the fact that round robin DNS is involved only with selecting a machine to handle a connection to a machine, and not with managing connections. What is needed is an apparatus and method for tracking connection attempts. If the number of unsuccessful connections attempted to a given machine were tracked, a reliable determination could be made that the machine is not going to respond to the connection request.

It would further be desirable if a failed machine could be temporally removed from the round robin rotation and could be periodically tested to determine if it is back on line. When a machine fails, it would be useful if a backup machine could be selected to replace the failed machine. For a system as described in Reference 1 and Reference 2, where many Internet sites are implemented on many servers, it would be further useful if a system and method were provided for flexibly determining which server might best serve as a backup for a server that has failed.

SUMMARY OF THE INVENTION

Accordingly, the present invention provides a system and method for determining when machines fail and providing backups. In one embodiment, a system and method for monitoring a connection, determining when the physical machine handling the connection is not responding, and ditching the connection are provided. After a certain amount of ditched connections, a physical machine is failed. Failed physical machines are periodically tested to see if they are back on line. A backup machine may take the place of a failed machine in a connection distribution system.

It should be appreciated that the present invention can be implemented in numerous ways, including as a process, an apparatus, a system, a device, a method, or a computer readable medium. Several inventive embodiments of the present invention are described below.

In one embodiment, a connection is redirected from a failed first server having a first server IP address. Incoming SYN packets sent from a client are intercepted. The SYN packets have a destination IP address corresponding to the connection and the SYN packets are sent from the client for the purpose of establishing the connection, which is supported by the first server. The number of incoming SYN packets sent from the client to the first server is monitored and it is determined whether the number of unanswered SYN packets sent by the client to the first server exceeds a ditched connection threshold number of unanswered SYN packets. The destination IP address of intercepted incoming SYN packets is changed for the connection received after determining that the number of unanswered SYN requests sent by the client to the first server exceeds a ditched connection threshold number of unanswered SYN requests to the destination IP address of a second server. In this manner, the SYN packets sent from the client for the purpose of establishing the connection are sent to the second server so that the connection is established with the second server.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 2C illustrates the data structure of a virtual machine object.

FIG. 2D illustrates the data structure of a physical machine object.

FIG. 2E illustrates a connection object data structure.

FIG. 2F illustrates a Port object data structure.

DESCRIPTION OF THE PREFERRED EMBODIMENTS

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
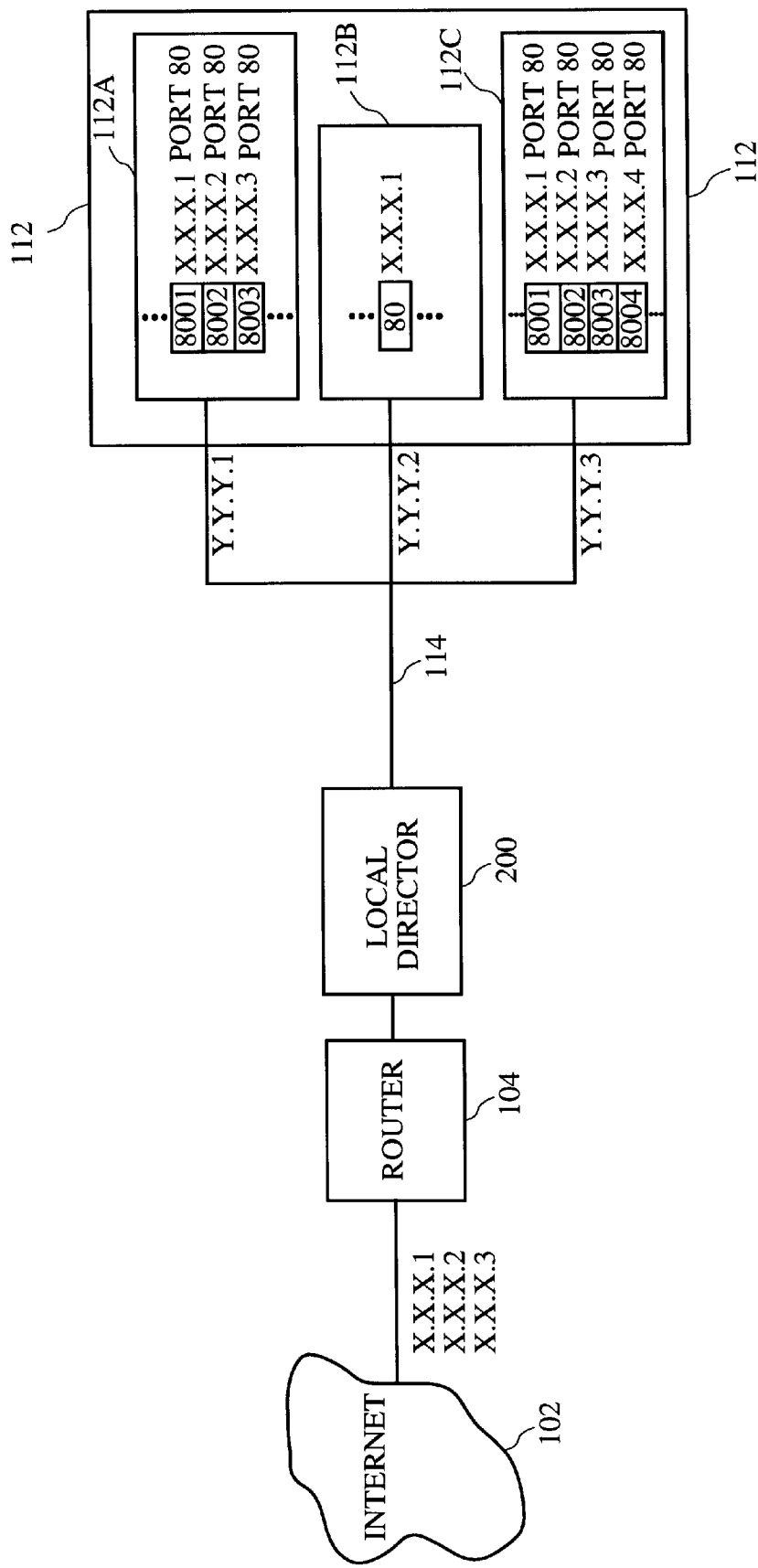
FIG. 1 is a block diagram of a network segment which includes many virtual machines and/or port numbers corresponding to many different IP addresses which are implemented on a group of physical machines which can service the IP addresses.

FIG. 1 is a block diagram of a network segment which includes many virtual machines and/or port numbers corresponding to many different IP addresses which are implemented on a group of physical machines which can service the IP addresses. A group of TCP based servers 112 is connected to the whole of the Internet 102 through a router 104. Specifically, router 104 typically provides a connection to an Internet service provider. A Local Director 200 is directly connected to router 104 and serves as a front end to group of TCP based servers 112. The group of TCP based servers 112 (including server 112A, server 112B, and server 112C in the example shown in FIG. 1 may include a large number of servers and may generally provide any kind of TCP service.

For example, the group of TCP based servers 112 may be World Wide Web servers, FTP servers, mail servers, news servers, database servers, Telnet servers, etc., or the group of TCP based servers may each perform a combination of those tasks. Servers 112A, 112B, and 112C as well as other servers and devices are connected to one another through a network cable 114.

It should be recognized that throughout this specification, the user who is accessing internet site via Local Director 200 is referred to as the "client," and the group of machines associated with Local Director 200 are referred to as "servers." It should, however, be recognized that in certain applications, the group of machines associated with Local Director 200 would actually be considered the client and the device on the other side of Local Director 200 would be considered the server. Such applications also fall within the scope of the present invention. It should also be recognized that, although the embodiment described establishes connections to the Internet using TCP/IP, the present invention may also be used in conjunction with other protocols to connect to a LAN or WAN. In fact, some aspects of the invention may be employed with a connectionless protocol such as UDP.

Requests to a virtual machine from external sites on Internet 102 are routed through Local Director 200. Local Director 200 determines which server of group of TCP based servers 112 should receive the request. A group of virtual IP addresses are defined for the internet sites which are implemented on group of TCP based servers 112. Each virtual IP address is an IP address which the outside world, including the rest of the Internet 102, uses to access an internet site implemented on either one or some combination of the physical machines which make up group of TCP based servers 112. The individual identities and IP addresses of the individual servers within the group of TCP based servers 112 are not evident to the user. A plurality of virtual machines may be implemented on different port numbers on certain of the real or physical machines. Other physical machines may be configured to service only one specific domain name. Each virtual machine may allocate connections to a plurality of physical machines, or on a single physical machine if desired.

Local Director 200 effectively simulates communication inbound to virtual machines having virtual IP addresses using the set of physical machines provided in the group of TCP based servers 112 by intercepting inbound packets sent to a virtual machine and replacing the virtual IP address and port number with a physical machine IP address and port number. Similarly, the Local Director 200 effectively simulates communication outbound from one or more virtual machines by intercepting outbound packets from the physical machines and replacing the physical machine IP addresses and port numbers with virtual machine IP addresses and port numbers.

When router 104 receives a request to access an internet site supported by Local Director 200 by a domain name (e.g., www.NameX.com), that domain name is mapped to the IP address of the internet site. This is done by a DNS server. The DNS server does not provide a real IP address of a real machine, but instead provides a virtual IP address of a virtual machine which is implemented on Local Director 200. Local Director 200 then receives all packets sent to virtual IP addresses implemented on the Local Director and translates the addresses and port numbers to a selected IP address and port number for a selected individual server among the group of TCP based servers 112. Local Director 200 accomplishes this by changing the destination IP address and port number in each packet from the virtual IP address and port number which corresponds to the virtual machine to a real IP address and port number which corresponds to a single physical machine, i.e. the IP address and port number of the individual server which is selected or mapped to handle connections for that virtual IP address and port number.

Local Director 200 thus operates to distribute packets among group of TCP based servers 112 or at least among ports of a single server by intercepting each packet sent to a virtual machine and changing the destination IP address and port number in the packet from a virtual IP address and port number to a real IP address and port number which corresponds to a physical machine IP address and port number which has been made available to implement the virtual machine.

In the example shown, a physical machine 112A is configured to support three IP addresses. Actual ports 8001, 8002, and 8003 as shown have daemons running on them which run processes corresponding to port 80, the well known port that handles worldwide web traffic, for virtual IP addresses x.x.x.1, x.x.x.2, and .x.x.x.3, respectively. Physical machine 112A may also contain ports that correspond to the other well known ports such as the FTP port as well as other ports that are not shown. Physical machine 112B supports only a single virtual IP address, x.x.x.1. Port 80 of the virtual machine is therefore mapped directly to port 80 of physical machine 112B. Physical machine 112C specializes in handling WorldWide web traffic and so it contains only ports which are mapped to port 80 of various virtual machines. Local Director 200 translates packet IP addresses and port numbers to distribute packets among all of these machines using the actual IP addresses of the machines, which are shown as Y.Y.Y.1, Y.Y.Y.2, and Y.Y.Y.3.

It should be noted that packets addressed to x.x.x.1 and port 80 can be sent to any of the three physical machines. It should also be noted that packets addressed to any of x.x.x.1/port 80, x.x.x.2/port 80, and x.x.x.3/port 80 can be sent to either the first or third machine. A session distribution scheme decides which physical machine is to handle each new connection. Packets addressed to x.x.x.4 can only be sent to the third machine.

When a TCP connection is initiated, a SYN request is sent from the user. If the SYN request is not acknowledged, the user will generally resend the request a number of times before giving up. Occasionally, the physical machine selected by the session distribution scheme fails to acknowledge a SYN request. Local Director 200 prevents this from creating undue delays for clients in two ways. First, Local Director 200 monitors the number of resends of each SYN requests and makes a determination after a threshold number of resends that the selected physical machine is not handling the request. Local Director 200 then classifies the connection as a ditched connection and runs the session distribution scheme again to find another machine to handle the connection. In certain embodiments, Local Director 200 prevents the session distribution scheme from selecting the physical machine that ditched the connection, except as a last resort.

In this manner, Local Director 200 determines when a machine is not responding to a SYN requests and steps in to find another machine to handle the connection. It should be noted that, unless this is done, it is up to the client to determine that too many attempts have been made and then start over by sending a new DNS request to establish a new connection. In certain embodiments, Local Director 200 sends the client an error message so that the client will attempt to establish a new connection. In other embodiments, Local Director does not send the client an error message and instead lets the client resend the SYN packet. The resent SYN packet is sent to the machine selected by the session distribution scheme to replace the machine that ditched the connection. Thus, before the client gives up on the connection and tries a new connection, Local Director 200 may select a new physical machine to handle the connection and send a SYN packet to that machine. The client may never be aware that the connection was ditched by the first machine.

The second way in which Local Director 200 prevents undue delays for clients is by replacing physical machines with backup machines. To prevent connections from being assigned to a failed machine and ditched, Local Director 200 monitors the number of connections ditched by each machine and changes the status of a machine to failed when a certain number of connections are ditched. Local Director 200 then selects a backup machine to replace the failed machine in the session distribution scheme. Failed machines are periodically tested to determine if they are ready to receive connections.

To handle the server backup protocols of this invention, Local Director 200 employs various process steps involving data manipulation. These steps require physical manipulation of physical quantities. Typically, these quantities take the form of electrical or magnetic signals capable of being stored, transferred, combined, compared, and otherwise manipulated. It is sometimes convenient, principally for reasons of common usage, to refer to these signals as bits, values, variables, characters, data packets, or the like. It should be remembered, however, that all of these and similar terms are to be associated with the appropriate physical quantities and are merely convenient labels applied to these quantities.

Further, the manipulations performed are often referred to in terms, such as translating, running, selecting, specifying, determining, or comparing. In any of the operations described herein that form part of the present invention, these operations are machine operations. Useful machines for performing the operations of the present invention include general purpose and specially designed computers or other similar devices. In all cases, there should be borne in mind the distinction between the method of operations in operating a computer or other processing device and the method of computation itself. The present invention relates to method steps for operating a Local Director system in processing electrical or other physical signals to generate other desired physical signals.

The present invention also relates to an apparatus for performing these operations. This apparatus may be specially constructed for the required purposes, or it may be a general purpose programmable machine selectively activated or reconfigured by a computer program stored in memory. The processes presented herein are not inherently related to any particular computer or other apparatus. In particular, various general purpose machines may be used with programs written in accordance with the teachings herein, or it may be more convenient to construct a more specialized apparatus to perform the required method steps. The general structure for a variety of these machines will appear from the description given below.

Still further, the present invention relates to machine readable media on which are stored program instructions for performing operations on a computer. Such media includes by way of example magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

Figure 2A:
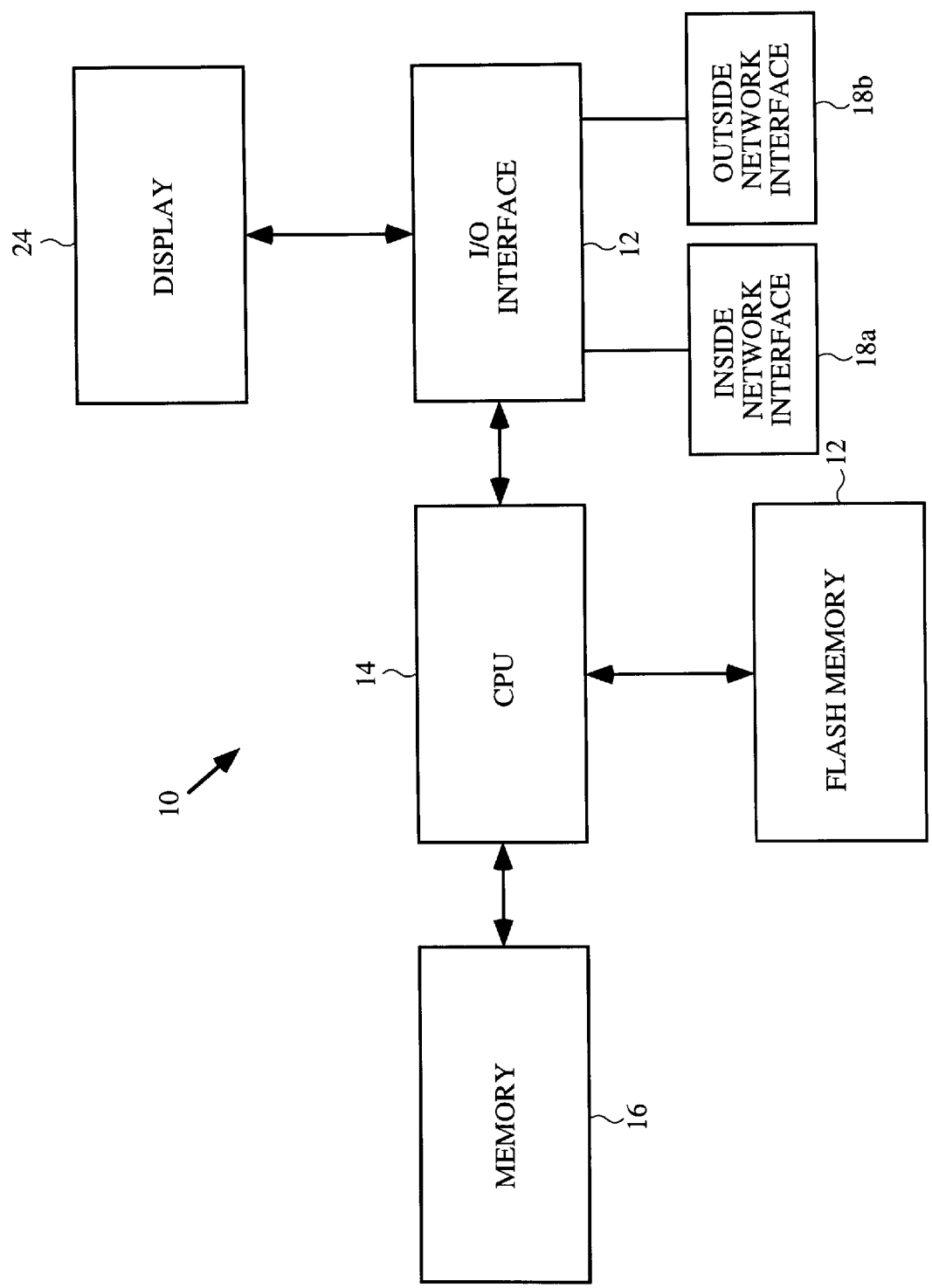
FIG. 2A shows a typical computer-based system which may be used as a Local Director of the present invention.

FIG. 2A shows a typical computer-based system which may be used as a Local Director of the present invention. Shown is a computer 10 which comprises an input/output circuit 12 used to communicate information in appropriately structured form to and from the parts of computer 10 and associated equipment, a central processing unit 14, and a memory 16. These components are those typically found in most general and special purpose computers 10 and are intended to be representative of this broad category of data processors.

Connected to the input/output circuit 12 are inside and outside high speed Local Area Network interfaces 18a and 18b. The inside interface 18a will be connected to a private network, while the outside interface 18b will be connected to an external network such as the Internet. Preferably, each of these interfaces includes (1) a plurality of ports appropriate for communication with the appropriate media, and (2) associated logic, and in some instances (3) memory. The associated logic may control such communications intensive tasks as packet integrity checking and media control and management. The high speed interfaces 18a and 18b are preferably multiport Ethernet interfaces, but may be other appropriate interfaces such as FDDI interfaces, etc.

The computer system may also include an input device (not shown) such as a keyboard. A flash memory device 19 is coupled to the input/output circuit 12 and provides additional storage capability for the computer 10. Flash memory device 19 may be used to store programs, data and the like and may be replaced with a magnetic storage medium or some other well known device. It will be appreciated that the information retained within the flash memory device 19, may, in appropriate cases, be incorporated in standard fashion into computer 10 as part of the memory 16.

In addition, a display monitor 24 is illustrated which is used to display the images being generated by the present invention. Such a display monitor 24 may take the form of any of several well-known varieties of cathode ray tube displays and flat panel displays or some other type of display.

Although the system shown in FIG. 2A is a preferred computer system of the present invention, the displayed computer architecture is by no means the only architecture on which the present invention can be implemented. For example, other types of interfaces and media could also be used with the computer.

Figure 2B:
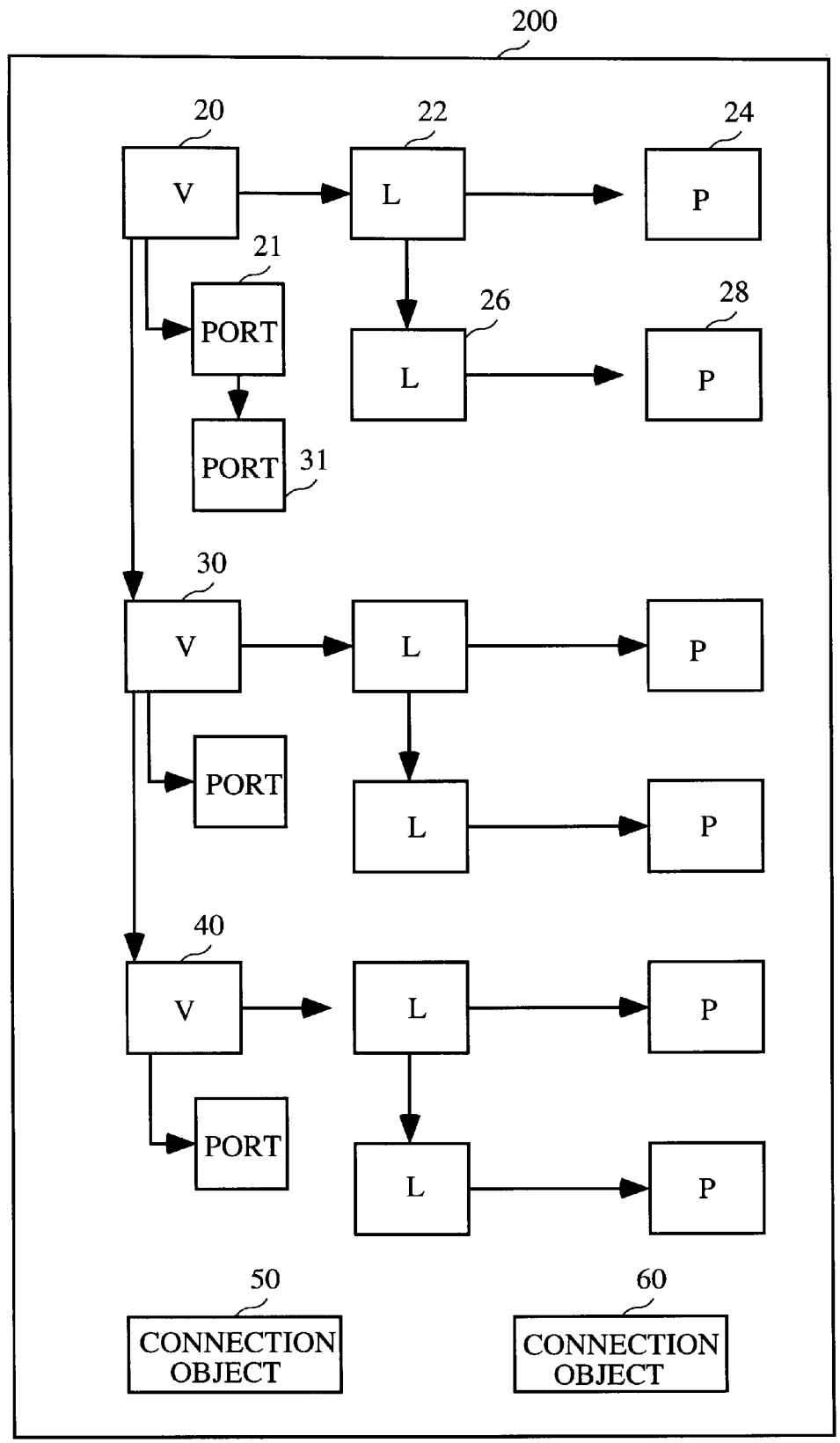
FIG. 2B illustrates an arrangement of data structures within the Local Director suitable for keeping track of the virtual machines implemented on the Local Director and the physical machines available to service those machines in one embodiment.

FIG. 2B illustrates an arrangement of data structures within Local Director 200 suitable for keeping that keeps track of the virtual machines implemented on Local Director 200 and the physical machines available to service those machines in one embodiment. A first virtual machine object 20 stores information about a first virtual machine. Virtual machine object 20 points to a port object 21 that maps the virtual port of the virtual machine onto a physical port of a physical machine. Virtual machine object 20 also points to a Link object 22 which points to a physical machine object 24, as well as another link object 26 that points to a physical machine object 28. Together, the virtual machine objects form a linked list that facilitates searching for the virtual machine which corresponds to a new connection request. Likewise, the link objects form a linked list that facilitates searching for a physical machine to handle a new connection. Other virtual machine objects such as virtual machine object 30 and virtual machine object 40 are also defined for other virtual machines. A connection object 50 and a connection object 60 contain pointers to the virtual machines and physical machines which correspond to the connections which they represent. Port objects may also be organized as linked lists. For example, port object 21 points to port object 31.

FIG. 2C illustrates the data structure of a virtual machine object 200. Virtual machine object 200 includes a pointer 202 to the next virtual machine object to facilitate searching through the virtual machine objects. Virtual machine object 200 also includes a virtual machine IP address 204 which stores the IP address of one of the virtual machines which is being implemented by Local Director 200. A pointer 206 to a port object accesses a linked list of port objects which list the physical machine port mapping for each of the ports supported by the virtual machine. A pointer 208 to a link object facilitates searching for the physical machine object which has the best predicted response according to the chosen session distribution scheme. A state variable 210 stores the state of the virtual machine. A backup variable 212 stores a backup for the virtual machine. State variable 210 indicates whether the virtual machine is failed. A virtual machine is failed if all of the physical and virtual machines available to service it are failed.

FIG. 2D illustrates the data structure of a physical machine object 278. Physical machine object 278 is used to store information related to a particular physical machine which is selected by Local Director 200 for the purpose of serving connections to a virtual machine. Physical machine object 278 contains a pointer 220 to the next physical machine object which facilitates searching among the physical machine objects. Physical machine object 278 also contains the real IP address 221 of the physical machine which it represents. A variable 222 stores the state (for example, in service or failed) of the physical machine and a variable 224 stores the number of ditched connections to the physical machine. Ditched connections are connections that are not successfully made after a number of resend of a SYN request. A variable 226 stores the connection failure threshold that determines the number of ditched connections required to fail the machine and a pointer 228 points to a backup machine. A port variable 230 stores a port number which indicates whether physical machine object 220 corresponds to an individual port on a machine. If port variable 230 is zero, then physical machine object 220 corresponds to all ports of a physical machine. Any other number is interpreted as a port number that the physical machine represents.

FIG. 2E illustrates a connection object data structure 240. Connection object 240 stores information related to individual connections made from a client to one of the physical machines. These are employed so that packets transmitted from the client to a virtual machine after a connection is established are routed to the physical machine for which the connection has been established. Connection object 240 includes a pointer 241 to the next connection object on its linked list hash chain. This pointer facilitates searching among the connection objects. In a preferred embodiment, the individual connection objects are stored in a hash chain to facilitate retrieval. Connection object 240 also includes the foreign IP address 242 and foreign port number 244 of the client which is making the connection, and the virtual machine address 246 and virtual machine port number 248 of the virtual machine which is being implemented for the connection. Connection object 221 also contains a physical IP address 250 of the physical machine to which the connection is made. Variable 252 also stores the physical machine mapped port number. Variable 253 stores the number of times that a SYN packet has been resent to a physical machine to establish a connection. In certain embodiments, variable 253 is implemented as a series of flags as described below that indicate the state of the connection.

FIG. 2F illustrates a Port object data structure 260. Port object 260 is used to map the port requested by the client to be accessed on the virtual machine to the port on the selected physical machine to which the connection is actually made. Port object 260 includes a pointer 262 which points to the next port object in order to facilitate searching the port objects. A variable 264 stores the port number as viewed by the client. A variable 266 stores the port number as mapped to a physical machine port.

Using the data structures shown in FIGS. 2B through 2F, Local Director 200 is able to provide the necessary IP addresses, port numbers, and pointers to establish a connection and define a connection object. The connection object contains all the information necessary to change the destination IP address and port number of incoming packets to the IP address and port number of a physical machine that is implementing a virtual machine. Likewise, the connection object contains all the information necessary to change the source IP address and port number of outgoing packets to the IP address and port number of a physical machine that is implementing a virtual machine. The connection object also keeps track of the number of resends of a SYN packet to establish a connection. Connections can be ditched after a certain number of resends and a new physical machine assigned to the connection. A physical machine object tracks the number of ditched connections for each physical machine and Local Director 200 uses this information to fail machines that ditch too many consecutive connections. Each physical machine object also contains a pointer to a backup physical machine so that if the physical machine fails, a backup can be made available.

In one preferred embodiment, the Local Director identifies failed machines by examining each SYN request to determine whether it is a resend, keeping track of the number of resends for each connection, ditching connections which have exceeded a threshold number of resends, and keeping track of the number of ditched connections. For each physical machine, the Local Director keeps track of how many connections the machine has ditched since its last successful connection. Once the number of ditched connections exceeds a threshold, the Local Director classifies the machine as failed and replaces the machine with a backup machine, if one exists. If no backup machine exists, then the Local Director removes the failed machine from the set of physical machines which are evaluated according to the session distribution algorithm for the purpose of finding the best physical machine to handle a new connection.

Figure 3:
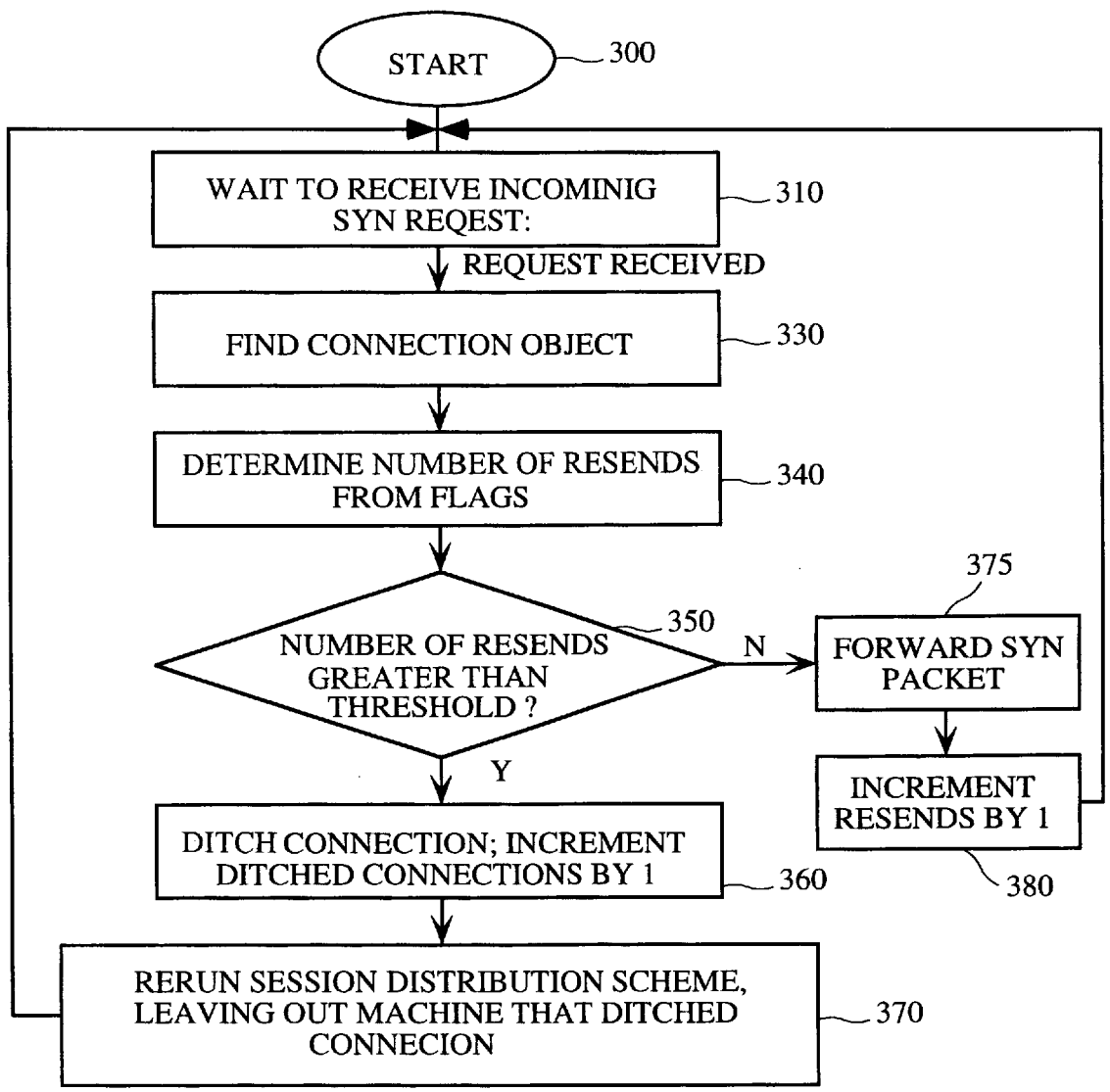
FIG. 3 is a process flow diagram which illustrates the process implemented on the Local Director for tracking the number of resends for a given connection and determining when to ditch the connection.

FIG. 3 is a process flow diagram which illustrates the process implemented on Local Director for tracking the number of resends for a given connection and determining when to ditch the connection. The process starts at 300. An incoming SYN request is received in a step 310. Local Director searches the connection objects which contain the information necessary to manage the connections for a connection object which has a source IP address and source port number and virtual destination IP address and port number which matches the source IP address and port number and destination IP address and port number of the incoming SYN request packet. It should be noted that the source IP address and port number and destination IP address and port number of a packet are sometimes referred to as a "quad." In a step 330, the Local Director finds a connection object with a quad that matches the quad of the incoming SYN request.

Next, in a step 340, the Local Director checks the flags of the connection object to determine how many resends have occurred for the connection object. In a step 350, the Local Director determines whether the number of resends is greater than an allowed threshold number of resends. If the number of resends exceeds the threshold, then control is transferred to a step 360 and the Local Director ditches the connection. When the connection is ditched, the number of connections ditched by the physical machine is incremented by one. The number of ditched connections is stored in the physical machine object. Next, in a step 370, the Local Director reruns the session distribution algorithm leaving out the physical machine which just ditched the connection. In some embodiments, if no other machine is found to be available by the session distribution algorithm, then the physical machine which just ditched the connection may be used as a last resort. In either case, Local Director passes the name of the physical machine that just ditched the connection to the session distribution scheme so that it is not considered when determining the best physical machine to handle the connection.

As a result of this process, when a physical machine becomes incapable of responding to an incoming SYN request for any reason, a client attempting to use a connection assigned to that machine will continue to attempt to resend its SYN request. After the threshold number of resends are sent, the Local Director classifies the connection as ditched, ditches the connection and using the session distribution scheme, finds an alternate physical machine to service the connection. In order to prevent the client from being again assigned to the physical machine which did not successfully respond to the client's last SYN request, the identity of the physical machine which ditched the last connection attempt is passed to the session distribution scheme. The session distribution scheme then selects the best machine out of all other available physical machines, leaving out the physical machine which just ditched the connection. If all other physical machines are failed, then the Local Director will reassign that same physical machine to the new connection as a last resort.

Avoiding sending a ditched connection to the same physical machine which unsuccessfully handled the connection is important because if that machine has failed, but is not yet classified as failed, then it is likely to have ditched most of its connections, and as a result of having few connections, may appear to be a desirable machine for new connections according to the session distribution scheme used in some embodiments. Using the machine which ditched the last connection attempt only as a last resort prevents a single client from having the burden of repeatedly attempting to connect to the physical machine until the physical machine is classified as failed. If the physical machine is indeed incapable of handling connections, then connections attempts from other clients will be ditched and the burden of unsuccessful or ditched connections will be shared among the clients.

If the Local Director determines checks in step 350 that the number of ditched connections is not greater than the threshold, control is transferred to a step 375. The SYN packet is forwarded in step 375 and, in a step 380 the number of resends is incremented by one. In one embodiment, the connection object contains a set of flags which track the state of the connection to determine the number of resends of a SYN packet for each connection. Thus, whenever a connection object is found for an incoming SYN packet, all of the information necessary to determine the history of previous attempts to get a response to the SYN packet from the physical machine handling the connection is available in the connection object. A flag is set in the physical machine object that increments the number of resends in the connection object found in step 330 by one. Whether the connection is ditched and the session distribution scheme elects a new machine in step 370 or whether the packet is forwarded in step 375 and the number of ditched connections is incremented by one in step 380, control is transferred back to step 310 and the Local Director waits to receive another incoming SYN request.

Figure 4:
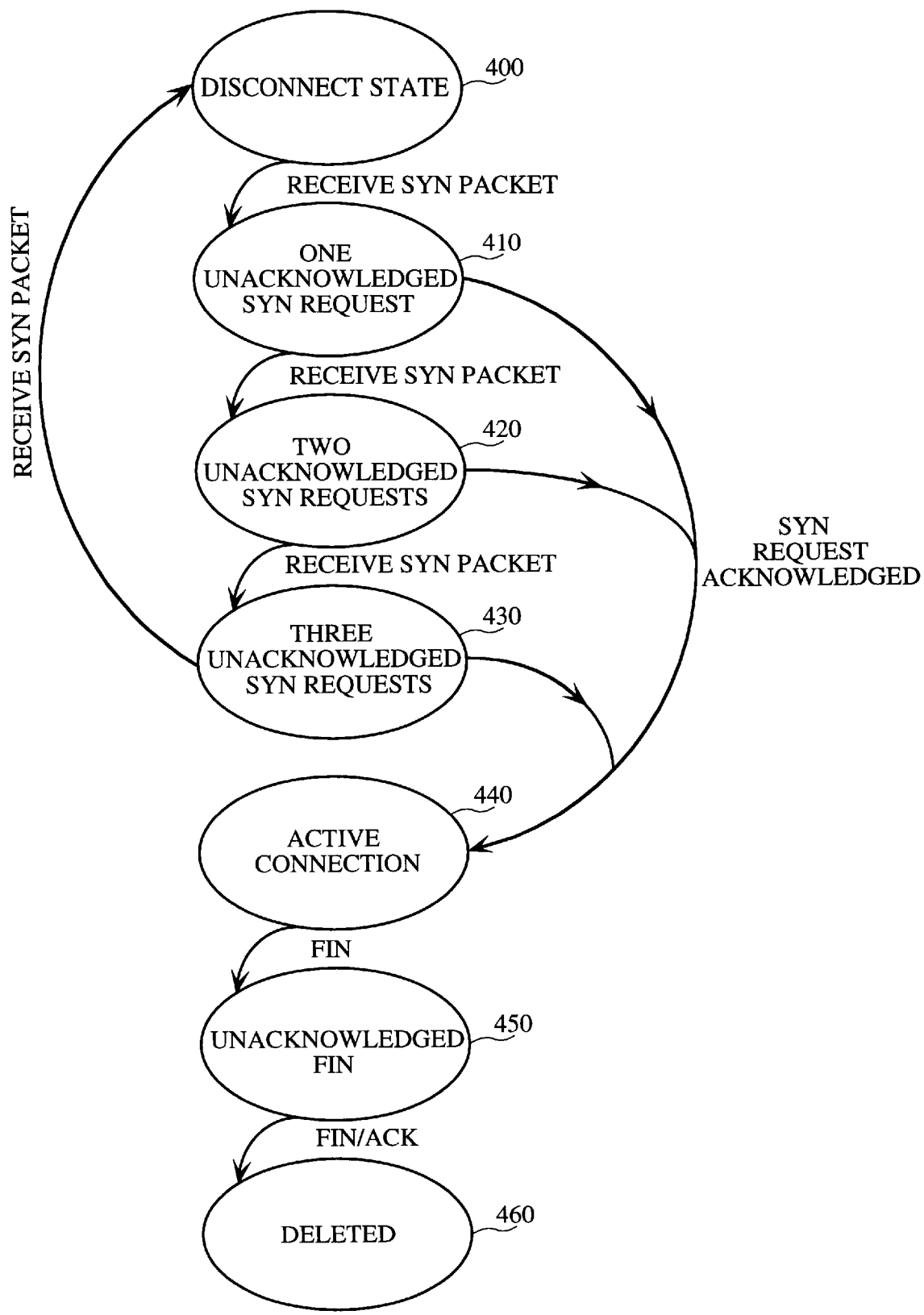
FIG. 4 is a state diagram which illustrates the state of a connection.

FIG. 4 is a state diagram which illustrates the state of a connection. Disconnect state 400 is the initial state of the connection object when it is created. In disconnect state 400, no connection has yet been allocated to the connection object and no SYN request has yet been received by the connection object. The connection object has merely been allocated to the connection and a physical machine for handling the connection has been selected and stored in the connection object. Upon receipt of a first SYN packet, the connection object enters a state 410 which indicates that one unacknowledged SYN packet has been received. If another SYN packet is received from a client, then the connection object transitions to a state 420, the state of two unacknowledged SYN requests. If another SYN request is received, then the connection object transitions to a state 430 which corresponds to three unacknowledged SYN requests.

If another SYN request is received then the Local Director will determine in step 350 shown in FIG. 3 that the threshold number of unacknowledged SYN requests has been exceeded and will select a new physical machine to handle the connection. The connection object will transition back to state 400 and wait for the next SYN packet to be received. When the connection object is in state 410, state 420, or state 430, and a SYN ACK packet is received from the physical machine assigned to handle the connection, then the connection object transitions to a state 440 which is an active connection state. The connection object remains in state 440 for the duration of the connection until the receipt of a FIN signal from the physical machine handling the connection causes the connection to transition to a state 450 which corresponds to an unacknowledged FIN packet. Upon the receipt of a FIN/ACK packet from the client, the connection object is deleted, which is shown as a state 460.

Thus, the state of the connection, as indicated by the state flags in the connection object, depends on the number of resends for the connection. If the connection is ditched by a physical machine, and a new physical machine is selected to handle the connection, then the state turns to the state of having received zero SYN packets from the client and the new physical machine is given the opportunity to handle the connection. It should also be noted that although in the embodiment shown, a connection is ditched after four unacknowledged SYN packets are received, the threshold could be set at other numbers of unacknowledged SYN packets as well. It is desirable to set the number of the threshold at 3 or 4 connections so that a machine which has a transient problem such as being temporarily too busy does not unnecessarily ditch a connection, which requires running the session distribution scheme again and using processing power. So long as that machine responds to the third or fourth SYN request, Local Director system resources need not be spent on finding an alternate physical machine to handle the connection.

Figure 5A:
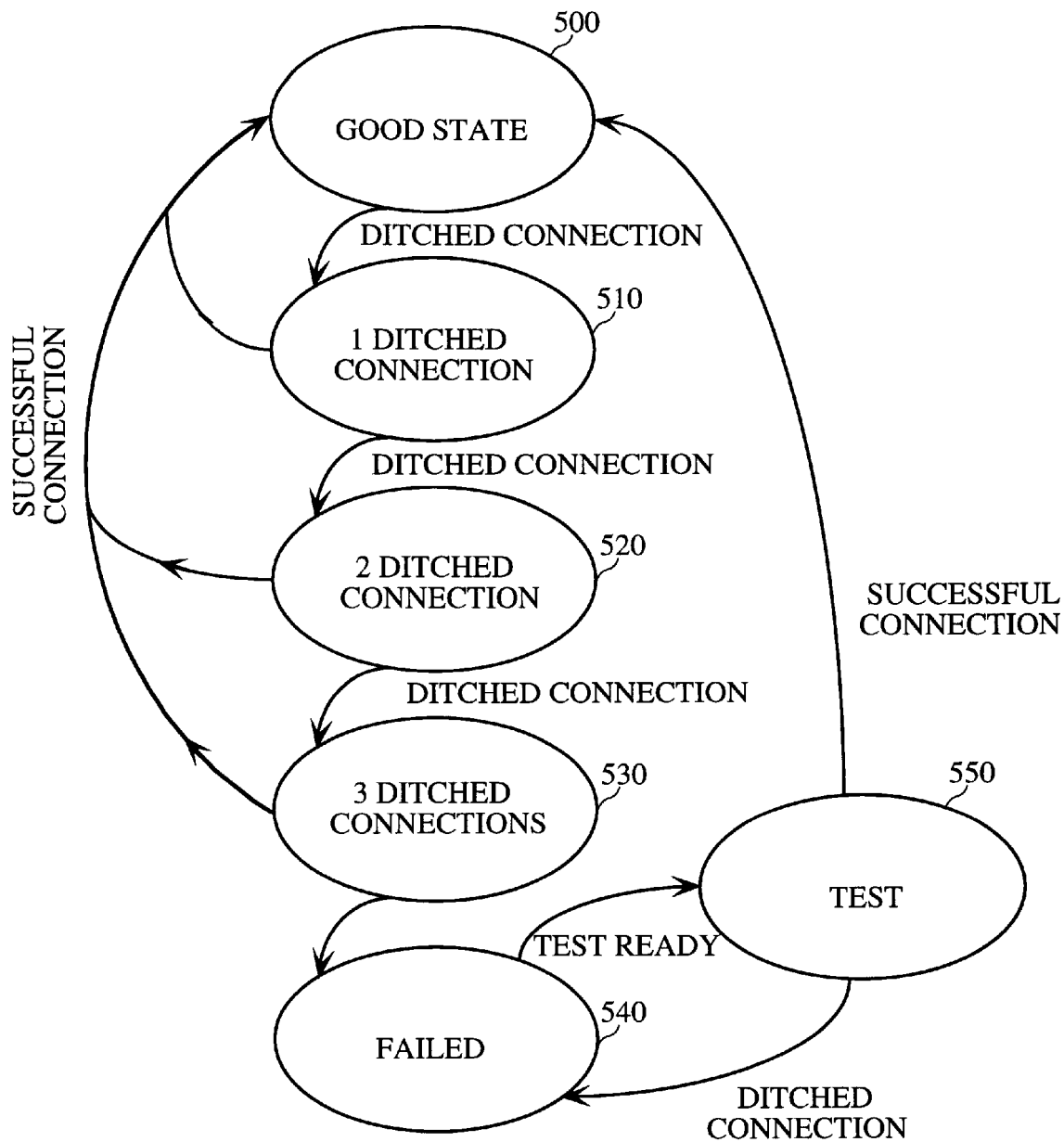
FIG. 5A is a state diagram for a physical machine object illustrating how the physical machine object changes state when connections are ditched.

In order to keep track of the number of ditched connections by a physical machine so that the physical machine may be failed after ditching a certain number of connections, the physical machine object contains flags that indicate how many connections have been ditched. FIG. 5A is a state diagram for a physical machine object illustrating how the physical machine object changes state when connections are ditched. The physical machine object starts in a good state 500. If a connection is ditched then the physical machine transitions to a state 510 which corresponds to one ditched connection. If another connection is ditched, then the physical machine objects transitions to a state 520 corresponding to two ditched connection. Similarly, if another connection is ditched then the physical machine object transitions to a state 530 of three ditched connections. If another connection is ditched, then the physical machine object transitions to a state 540 which is a failed state.

If the physical machine responds to a connection request while in state 510, state 520 or state 530, then the physical machine object transitions back to state 500 and the physical machine is reclassified as good. When the physical machine object is in state 540 corresponding to failure, a process runs on the Local Director which transfers the physical machine object to a test state 550 on a periodic basis. In one embodiment, this transition is made every 60 seconds to allow the physical machine to be selected by the session distribution scheme so that a connection may be attempted to the machine to determine whether or not the machine is still failed. If that connection is successfully handled, then the physical machine object transitions to the good state 500. If that one connection is not handled successfully and ditched, then the physical machine object transitions back to state 540 and the physical machine is again failed.

In this manner, it is quickly determined whether a physical machine is ditching all of its connections and the physical machine is failed. Failed physical machines are transitioned to the test state periodically so that it may be determined whether or not they have come back on line and are good for accepting connections. The test state only gives the physical machine one chance to successfully handle a connection and re-fails the machine upon a single ditched connection. This prevents connections from being attempted over and over again to a physical machine which is not on-line. On the other hand, a good physical machine is not failed immediately upon a single ditched connection so that a transient problem does not remove a good physical machine from service. Successful handling of a single connection transitions the physical machine back to the good state so that a machine which is operating at all, even though it may ditch a few connections occasionally, is not failed. It should be noted that in the embodiment shown, the machine is failed after four ditched connections. In other embodiments, other threshold numbers of ditched connections are used to fail the machine. Three or four ditched connections has been found to strike a balance between not sending too many connections to a failed machine and avoiding failing machines which are only sporadically ditching connections as a result of overuse. This is important since connections are sometimes ditched when a machine is very busy and it would be undesirable to drop machines from service when the set of physical machines available to the Local Director are the busiest.

Figure 5B:
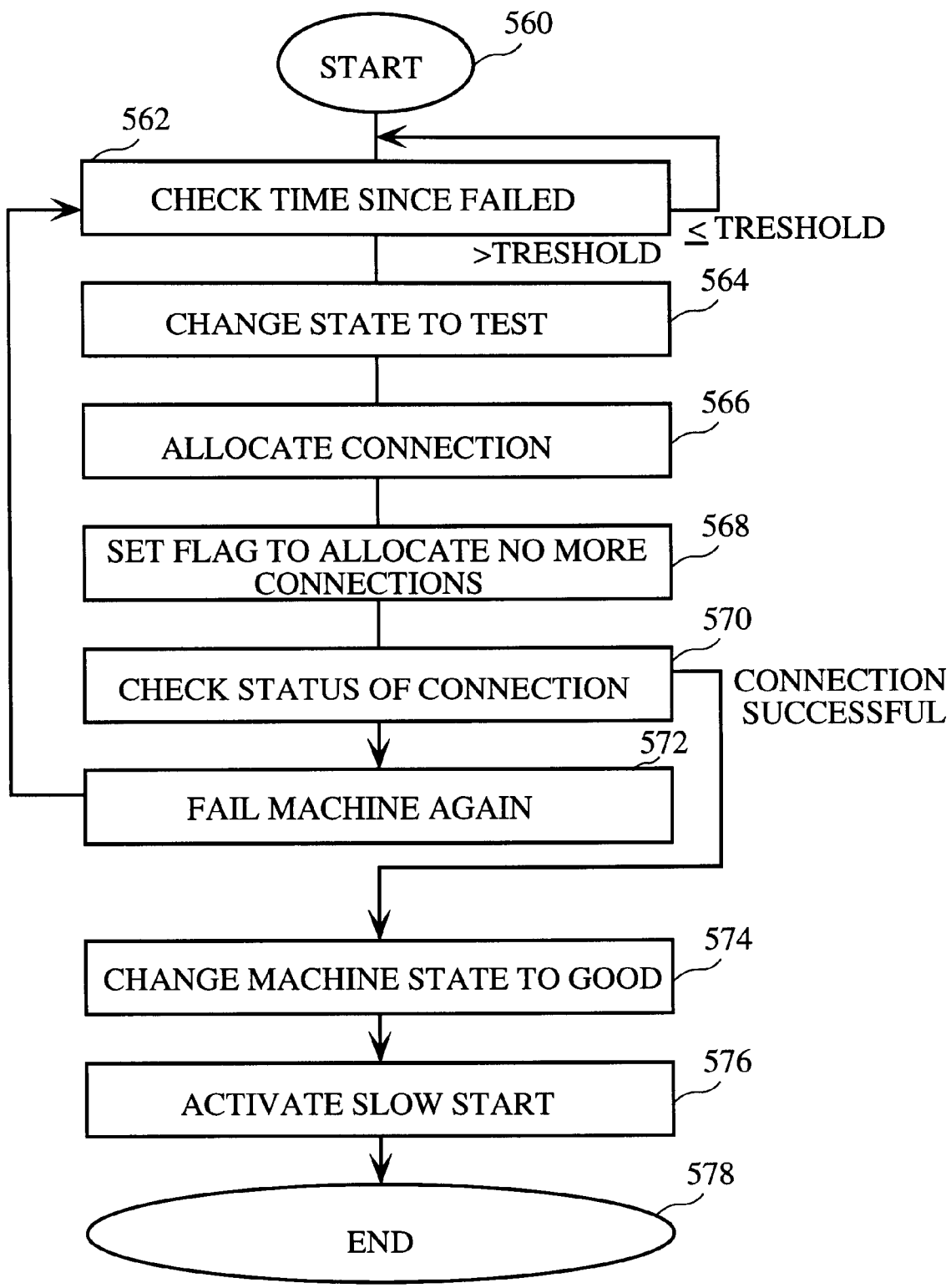
FIG. 5B is a process flow diagram illustrating a process implemented on a Local Director for checking failed machines by periodically testing them with one connection.

FIG. 5B is a process flow diagram illustrating a process implemented on a Local Director for checking failed machines by periodically testing them with one connection. The process starts at 560. In a step 562, the Local Director checks the time since the machine was last failed. If the time does not exceed a threshold then step 562 continues to periodically check the time since failed until it exceeds a threshold and control is transferred to a step 564. Step 564 changes the state of the physical machine to the test state. Control is then transferred to a step 566 where a connection is allocated to the physical machine. In some embodiments, the session distribution scheme is bypassed so that a connection is immediately allocated to the test machine. In other embodiments, the test machine merely becomes available to the session distribution scheme. It is likely that the test machine would soon receive a connection from the session distribution scheme since it would have no connections itself and therefore would appear to be a good candidate for a connection. Once a connection is allocated, then control is transferred to a step 568 and a flag is set in the physical machine object so that no more connections can be allocated to the physical machine in the test state. Control is then transferred to a step 570 which checks whether or not the physical machine in the test state ditched the connection allocated in step 566. If the connection is ditched, then control is transferred to a step 572 and the physical machine is immediately failed. Control is then transferred back to step 562 and the physical machine is retested after another waiting period. If the connection is not ditched, then control is transferred to a step 574 and physical machine is placed in the good state and the number of ditched connections from the physical machine is set to zero.

Local Director next activates the slow start algorithm for a sessions distribution scheme in a step 576 in certain embodiments. The purpose of activating a slow start session distribution scheme upon the reinstatement of a physical machine to service is that, when the physical machine comes back on-line after having been failed, it will have zero connections. In certain sessions distribution schemes which are used in certain embodiments, this will make that physical machine appear to be the most attractive physical machine for new connections until it catches up to the number of connections which are being handled by the other available physical machines. Sending every incoming connection consecutively to the same physical machine is undesirable because that physical machine is likely to become overwhelmed very quickly. Therefore a slow start session distribution scheme is used which prevents all connections from being allocated to the machine. In one embodiment, this is done by temporarily allocating connections to all the available physical machines in a round robin manner. In other embodiments Local Director implements other methods such as sending the identity of machines to the session distribution scheme as machines which are to be picked no more often than a certain frequency. The process ends at 578.

Thus, when a physical machine is failed, the Local Director periodically puts the physical machine into test mode and it receives one chance to successfully handle a connection. If the connection is ditched, then the physical machine is again failed. If the connection is handled successfully, then the physical machine is placed back in service and a slow start session distribution scheme which purposely avoids sending every connection to the newly operational physical machine is used to avoid sending all connections to that physical machine.

In certain embodiments, backup machines are defined for physical machines which fail. This is useful to prevent, among other things, a domino like failure or degradation of performance of all of the physical machines available to service a given virtual machine. In a case where all of the physical machines can handle the traffic load for the virtual machine but the traffic load would be sufficient to overwhelm the remaining physical machines if one or more of the other physical machines failed, then the failure of a single physical machine could trigger a severe degradation in performance. For that reason, a backup is defined which takes the place of the failed physical machine in the session distribution scheme. The backup is allocated connections so that it carries the load which the failed physical machine would have carried for the system. Physical machines which are used as backups for certain virtual machines, may be used as primary physical machines for servicing other virtual machines. In this manner, the full performance and flexibility of the Local Director system implementing many virtual machines on many physical is realized. Thus, not only can a number physical machines do double duty servicing a multiple number of virtual machines on a regular basis, but those same physical machines may also be used as backup physical machines to other virtual machines.

A system can be designed in which a virtual machine is set up to handle a worldwide web site and a certain number of physical machines can be allocated to that virtual machine. Other physical machines which are intended to primarily service other virtual machines can be used as backups so that it is guaranteed that a certain number of physical machines will be available to service each virtual machine without having to rely on dedicated backup machines. If dedicated backup machines are used, then it is possible to use a single backup machine or set of backup machines to backup many virtual machines since each backup machine can be designated as the backup machine for a number of physical machines which potentially service different virtual machines. In this manner, resources can be efficiently shared and excess system capacity for certain virtual machines can be utilized as backup capacity for other virtual machines.

Figure 6:
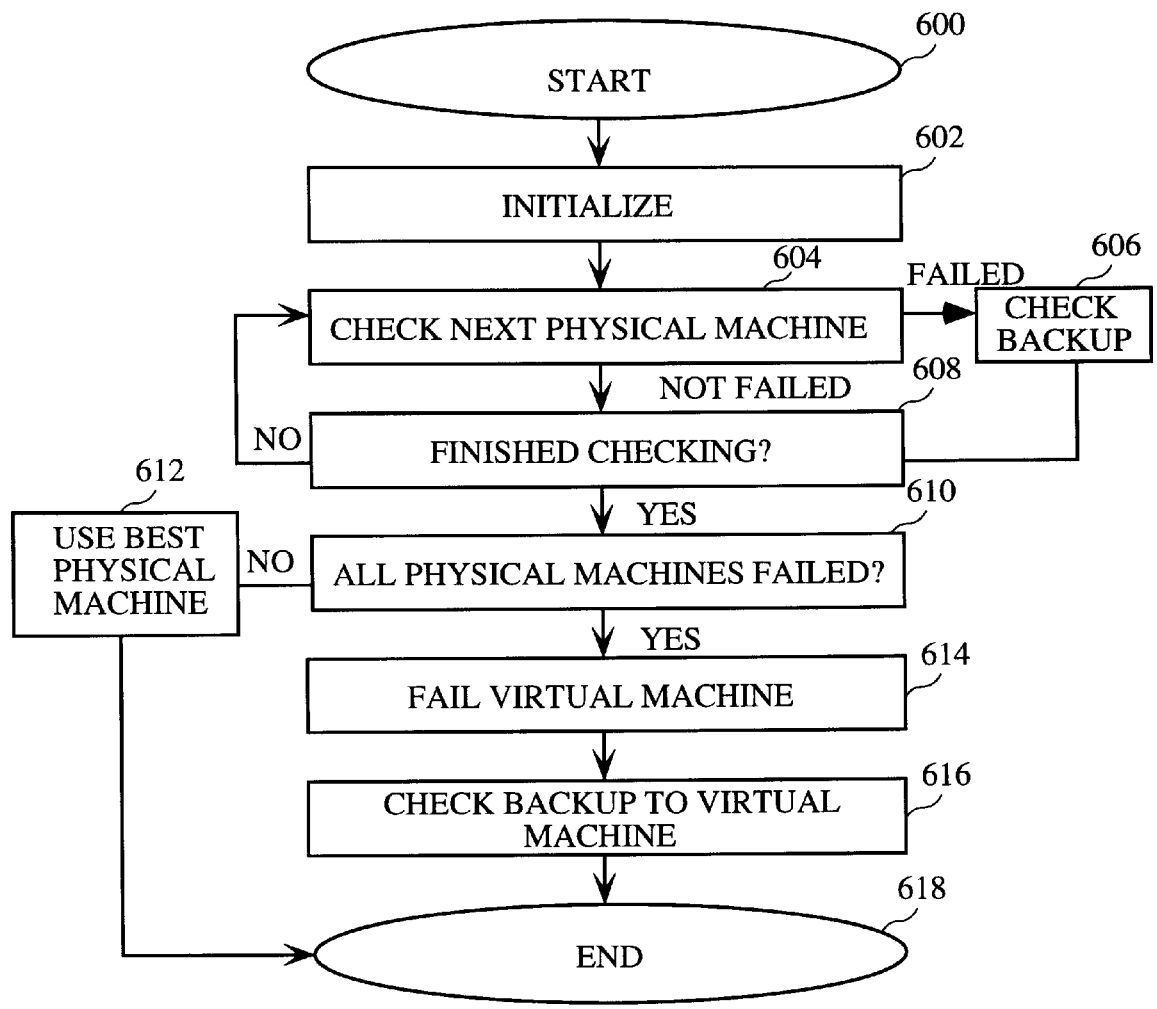
FIG. 6 is a process flow diagram which illustrates a procedure for checking backups using a session distribution scheme.

A virtual machine may also be defined as the backup to a physical machine. When such a virtual machine is called upon to back up a failed machine, then the session distribution scheme is used to determine which physical machine available to the virtual machine would be the best physical machine to handle connections. Thus, not only can a backup be chosen but a best backup physical machine can be chosen according to a session distribution scheme. FIG. 6 is a process flow diagram which illustrates a procedure for checking backups using a session distribution scheme. The session distribution scheme is invoked upon the receipt of a new connection request for the purpose of determining the best physical machine which supports the virtual machine for handling the new connection.

The process starts at 600. In a step 602, the Local Director initializes to the first physical machine that is linked to the virtual machine for which a connection is being handled. In a step 604, the next physical machine is checked to see if it has failed. If it has failed, then control is transferred to a step 606, and the backups are checked. If the backup to the physical machine itself has failed then any backups of the backup physical machine are checked. If the backup to the physical machine is a virtual machine then the session distribution scheme is run for all of the physical machines available to that virtual machine and the best physical machine, if any, is used as the backup to the physical machine checked in step 604. Whether the physical machine checked in step 604 is not failed, or a backup is found for that physical machine, or no backup is found, control is transferred to a step 608 which determines whether or not the session distribution scheme is finished checking all physical machines. If not, then control is transferred back to step 604 and the next physical machine is checked.

When the session distribution scheme is finished checking all of the physical machines, then control is transferred to a step 610 which determines whether all of the physical machines and backups have failed. If all have not failed, then control is transferred to a step 612 and the best available physical machine is used. If all of the physical machines have failed, then control is transferred to a step 614 and the virtual machine which forwards the session distribution scheme is classified as failed. Control is then transferred to a step 616 and any backups defined for the virtual machine are checked. If a physical machine is found as a backup to the virtual machine, then that machine is used to service connection requests for the virtual machine which was classified as failed in step 614. If no physical machine is found either among the physical machines available to the virtual machine and the backups to those physical machines or among the backup to the virtual machine, then no machine can be assigned to the incoming connection request. Whether or not a physical machine is assigned to the incoming connection request, the process ends at 618.

Figure 7:
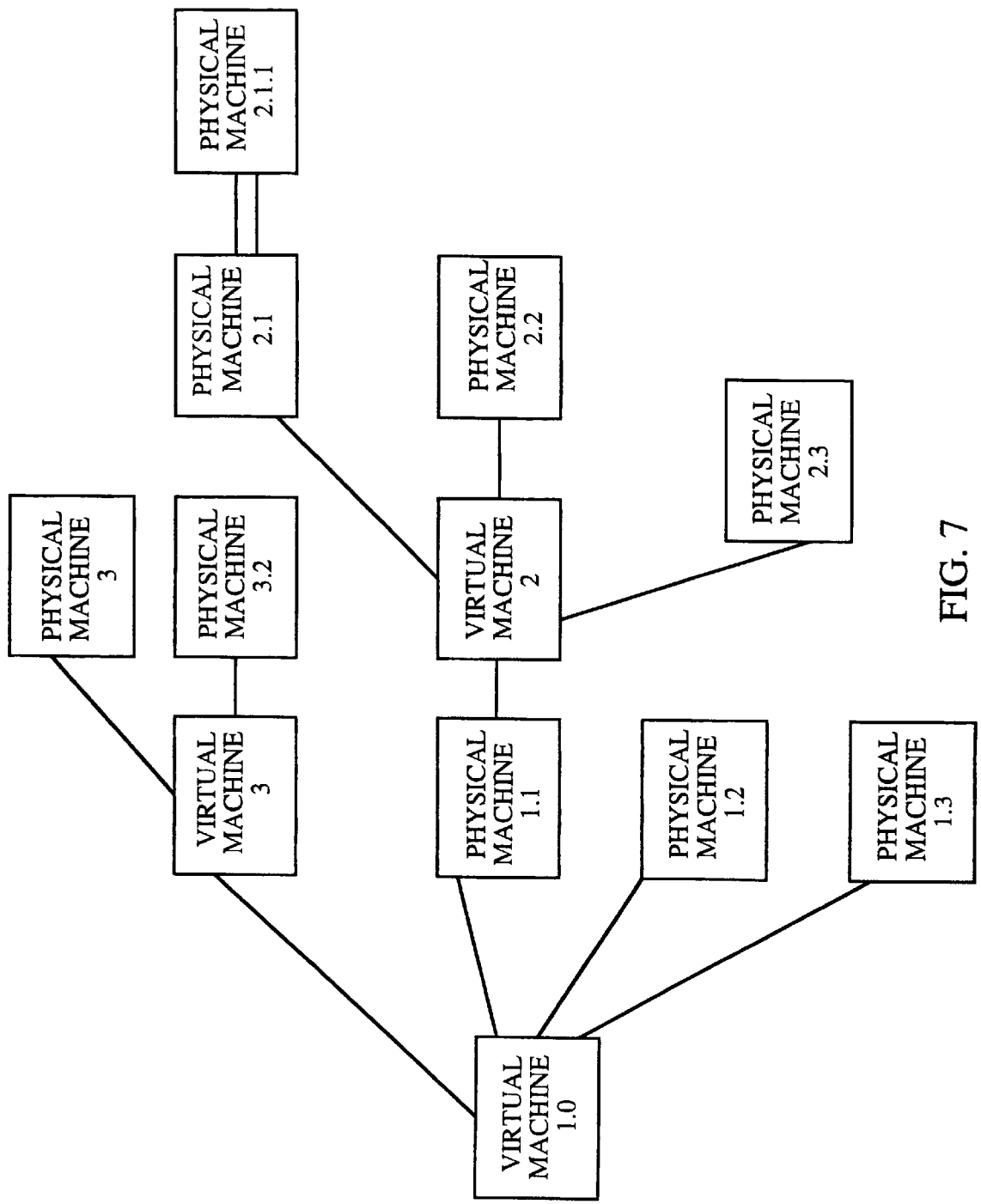
FIG. 7 is a block diagram illustrating one example of how backup machine relationships are defined in certain embodiments.

FIG. 7 is a block diagram illustrating one example of how backup machine relationships are defined in certain embodiments. Regular machine relationships which define physical machines that are available to virtual machines are indicated by single lines and backup machine relationships are indicated by double lines.

When a connection request is received for virtual machine 1.0, the session distribution scheme is run for physical machine 1.1, physical machine 1.2 and physical machine 1.3. If physical machine 1.1 is failed, then virtual machine 2 which is defined as a backup machine for physical machine 1.1 is used in place of physical machine 1.1. Since virtual machine 2 is a virtual machine, the session distribution scheme for virtual machine 2 must be run to determine whether physical machine 2.1, physical machine 2.2 or physical machine 2.3 will be selected to act as the backup to physical machine 1.1. Physical machine 2.1.1 is a backup physical machine 2.1.1 which takes the place of physical machine 2.1 when physical machine 2.1 fails in the session distribution algorithm run for virtual machine 2.

Generally, the definition of backup machines may be nested as many times as desired by the user. Defining a virtual machine as a backup machine enables all of the physical machines assigned to that virtual machine to be checked by a session distribution scheme to determine the best one to act as the backup. In some embodiments this is used to find the best physical machine and in other embodiments, where it is desired to not spend the processing power running session distribution schemes evaluating physical machines, virtual machines are not used as backup machines. If all of the potential backup candidates for physical machine 1.1 are failed, physical machine 1.1 is failed, physical machine 1.2 is failed, and physical machine 1.3 is failed, then no physical machine is available to service connections made to virtual machine 1.0 and virtual machine 1.0 itself is failed. Upon the failure of virtual machine 1.0, any backup to virtual machine 1.0 is used. In the example shown, virtual machine 3 is defined as a backup to virtual machine 1 and virtual machine 3 has two physical machines, physical machine 3.1 and physical machine 3.2, available to it. The session distribution scheme for virtual machine 3 is run and the best physical machine available to it is selected to act as a backup for virtual machine 1.0.

Figure 8:
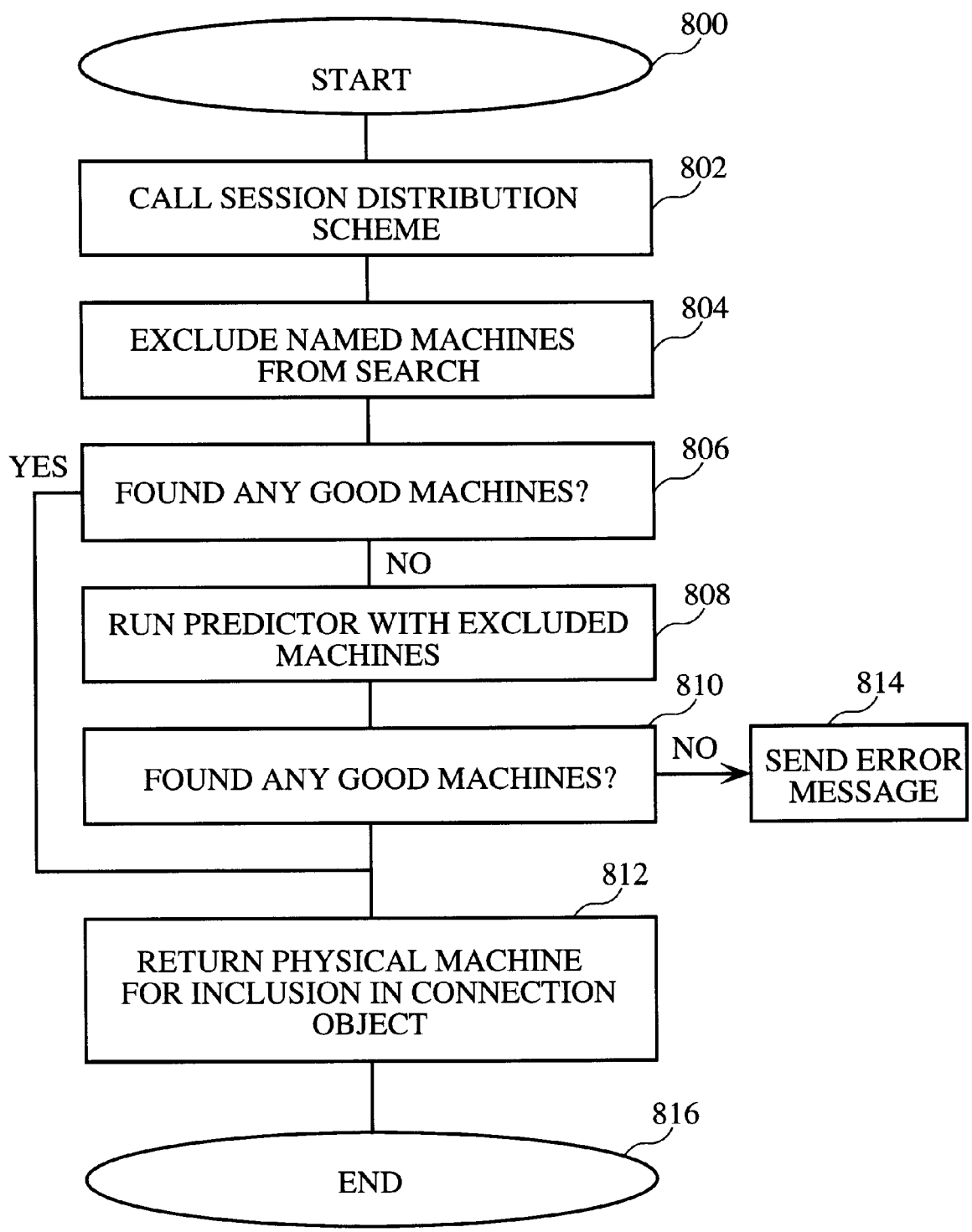
FIG. 8 is a process flow diagram illustrating a process which assigns an incoming connection to a machine while excluding a machine which previously ditched the connection request.

As described above, it is useful when a connection is ditched, to mark a physical machine which was selected and was unsuccessful at handling the connection to be assigned the connection a second consecutive time so that a single client will not have to keep trying a machine which is out of service until that machine is classified as failed. FIG. 8 is a process flow diagram illustrating a process which assigns an incoming connection to a machine while excluding a machine which previously ditched the connection request. The process starts at 800. In a step 802, the session distribution scheme is called. In a step 804, the named machines are excluded from the search. Next, in a step 806, it is checked whether any good machine has been found by the session distribution scheme. If not, then control is transferred to a step 808 and the session distribution scheme is run including the machines which were previously excluded in step 804. If a good machine is found in a step 810, then control is transferred to a step 812 and the good physical machine found is returned to the connection object. If no good machine is found in step 810 then control is transferred to a step 814 and an error message is sent. If a good machine is found in step 808, then control is transferred directly to step 812 and the good physical machine is returned to the connection object. Whether a physical machine is returned to connect object in step 812 or an error message is sent in step 814, the process ends at step 816.

Thus the Local Director uses the connection object to keep track of incoming SYN requests and to determine whether SYN requests for a specific connections are not being acknowledged. If greater than a threshold number of SYN requests are not acknowledged, then the state of the machine to which the connection was assigned is changed to reflect a ditched connection. When the number of ditched connections for any machine exceeds a certain threshold then the machine is classified as failed and is periodically tested to determine whether or not it has recovered. Until the machine recovers, a backup may be defined for that machine so that the other machines servicing connection requests are not overloaded as a result of the failure of one of the machines.

Backup machines may be defined as physical machines or as virtual machines so that a session distribution scheme may be run for a virtual backup machine to enable an optimal physical machine to be selected to act as a backup. In this manner, all of the resources available to the Local Director may be organized to respond to connection requests according to which machines are operational and which machines are best suited to receive connections at any given time.

Although the foregoing invention has been described in some detail for purposes of clarity of understanding, it will be apparent that certain changes and modifications may be practiced within the scope of the appended claims. It should be noted that there are may alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of redirecting a connection from a first server having a first server IP address comprising:

intercepting incoming SYN packets sent from a client, the packets having a destination IP address corresponding to the connection, the SYN packets being sent from the client for the purpose of establishing the connection, and the connection being supported by the first server;

monitoring the number of incoming SYN packets sent from the client to the first server;

determining that the number of unanswered SYN packets sent by the client to the first server exceeds a ditched connection threshold number of unanswered SYN packets; and changing the destination IP address of intercepted incoming SYN packets for the connection received after determining that the number of unanswered SYN requests sent by the client to the first server exceeds the ditched connection threshold number of unanswered SYN requests to the destination IP address of a second server, whereby the SYN packets sent from the client for the purpose of establishing the connection are sent to the second server so that the connection is established with the second server.

2. The method recited in claim 1 further including:

monitoring the number of times that the number of unanswered SYN packets sent to the first server exceeds the ditched connection threshold number of unanswered SYN packets, each such occurrence being counted as a ditched connection by the first server; and determining that the number of ditched connections by the first server exceeds a failure threshold number of ditched connections; and changing the status of the first server to a failed status;

whereby connections that may have been assigned to the first server may not be assigned to the first server because of the failed status of the first server.

3. method recited in claim 2 further including:

periodically changing the status of the first server to a test status, the test status being a status in which a limited number of test connections are assigned to the first server and in which a test failure threshold number of ditched connections is defined for changing the status of the server back to the failed status.

4. The method recited in claim 1 wherein the ditched connection threshold number of unanswered SYN packets is three.

5. The method recited in claim 1 wherein the ditched connection threshold number of unanswered SYN packets is four.

6. The method recited in claim 1 wherein the ditched connection threshold number of unanswered SYN packets is greater than two.

7. The method as recited in claim 2 wherein the failure threshold number of ditched connections is three.

8. The method recited in claim 2 wherein the failure threshold number of ditched connections is four.

9. The method as recited in claim 2 wherein the failure threshold number of ditched connections is greater than two.

10. The method recited in claim 3 wherein the limited number of test connections is one.

11. The method recited in claim 3 wherein the limited number of test connections is less than three.

12. The method recited in claim 3 wherein the test failure threshold number of ditched connections is less than three.

13. The method recited in claim 3 wherein the test failure threshold number of ditched connections is one.

14. The method recited in claim 2 further including:

assigning a backup server to replace the first server so long as the status of the first server is the failed status.

15. A connection management system for redirecting a connection from a first server having a first server IP address comprising:

a client interface to an external network, the client interface being operative to intercept incoming SYN packets sent from a client, the packets having a destination IP address corresponding to the connection, the SYN packets being sent from the client for the purpose of establishing the connection, and the connection being supported by the first server;

a connection status monitor, the connection status monitor being operative to monitor the number of incoming SYN packets sent from the client to the first server and determine whether the number of unanswered SYN packets sent by the client to the first server exceeds a ditched connection threshold number of unanswered SYN packets; and a packet translator monitor, the packet translator monitor being operative to change the destination IP address of intercepted incoming SYN packets for the connection received after determining that the number of unanswered SYN requests sent by the client to the first server exceeds the ditched connection threshold number of unanswered SYN requests to the destination IP address of a second server, whereby the connection management system redirects SYN packets sent from the client for the purpose of establishing the connection from the first server to the second server so that the connection is established with the second server.

16. The connection management system described in claim 15 further including:

a ditched connection monitor, the ditched connection monitor being operative to monitor the number of times that the number of unanswered SYN packets sent to the first server exceeds the ditched connection threshold number of unanswered SYN packets, each such occurrence being counted as a ditched connection by the first server and to determine whether the number of ditched connections by the first server exceeds a failure threshold number of ditched connections; and a failure status indicator, the failure status indicator being operative to indicate the failed status of the first server;

whereby the failure status indicator indicates that connections that may have been assigned to the first server should not be assigned to the first server because of the failed status of the first server.

17. The system recited in claim 16 further including:

a failed machine tester, the failed machine tester being operative to periodically change the status of the first server to a test status, the test status being a status in which a limited number of test connections are assigned to the first server and in which a test failure threshold number of ditched connections is defined for changing the status of the first server back to the failed status.

18. The system recited in claim 15 wherein the ditched connection threshold number of unanswered SYN packets is three.

19. The system recited in claim 15 wherein the ditched connection threshold number of unanswered SYN packets is four.

20. The system recited in claim 15 wherein the ditched connection threshold number of unanswered SYN packets is greater than two.

21. The system recited in claim 16 wherein the failure threshold number of ditched connections is three.

22. The system recited in claim 16 wherein the failure threshold number of ditched connections is four.

23. The system recited in claim 16 wherein the failure threshold number of ditched connections is greater than two.

24. The system recited in claim 17 wherein the limited number of test connections is one.

25. The system recited in claim 17 wherein the limited number of test connections is less than three.

26. The system recited in claim 17 wherein the test failure threshold number of ditched connections is one.

27. The system recited in claim 17 wherein the test failure threshold number of ditched connections is less than three.

28. The system recited in claim 16 further including a backup server designator, said backup server designator being operative to designate a backup server to replace the first server so long as the status of the first server is the failed status.

29. A method of redirecting packets from a first server having a first server IP address comprising:

intercepting incoming initialization packets sent from a client, the packets having a destination IP address corresponding to a communication protocol supported by the first server, the incoming packets being sent from the client for the purpose of establishing a communication, the communication being supported by the first server;

monitoring the number of incoming packets sent from the client to the first server;

determining that the number of unanswered initialization packets sent by the client to the first server exceeds a failed communication threshold number of unanswered initialization packets; and changing the destination IP address of intercepted incoming initialization packets for a communication received after determining that the number of unanswered initialization requests sent by the client to the first server exceeds the failed communication threshold number of unanswered initialization packets to the destination IP address of a second server;

whereby the initialization packets sent from the client for the purpose of establishing the communication are sent to the second server so that the communication is established with the second server.

30. In a site having one or more server machines for responding to clients, and having one or more virtual addresses, a method for reducing delay at said site in responding to said clients, the method comprising:

receiving from one of said clients a first packet addressed to a first virtual address of said site, said packet intended to elicit a response from said site;

selecting a first server machine for receiving said first packet, said first server machine being selected based upon its performance from said one or more server machines;

providing said first packet to said first server machine;

determining that the first server machine has failed to respond to said first packet and also has previously failed to respond to a defined number of packets deserving of responses;

receiving from said client a second packet addressed to said first virtual address; and selecting a second server machine for receiving said packet, wherein said second server machine is predesignated as a backup machine for said one or more server machines.

31. The method of claim 30, further comprising routing said second packet to said second server machine.

32. The method of claim 30, further comprising changing the status of the first server machine to a failed status, whereby packets addressed to the first virtual address that may have been assigned to the first server machine are not assigned to the first server machine because of its failed status.

33. The method of claim 32, wherein the first server machine status changes to failed after failing to respond a defined number of TCP connection attempts from one or more clients.

34. A system for routing packets sent from clients and addressed to a virtual address of a site to one or more server machines at said site, the system comprising:

a client interface to an external network, the client interface being operative to intercept incoming packets sent from said clients and addressed to said virtual address; and means for selecting one of said one or more server machines for receiving packets addressed to the virtual address and deserving of a response, said means for selecting one of said one or more server machine based upon (1) performance histories of the one or more server machines and (2) a number of times in which any one or more of the one or more server machines has failed to respond to a packet deserving response, wherein when said means for selecting finds that an otherwise selectable server machine has failed to respond to a defined number of packets, it directs an incoming packet to a backup machine instead of the otherwise selectable server machine.

35. The system of claim 34, further comprising a server machine interface operative to provide packets from said clients to said one or more server machines.

* * * * *